(12) United States Patent
Choi et al.

(10) Patent No.: US 10,682,606 B2
(45) Date of Patent: Jun. 16, 2020

(54) MULTILAYER AROMATIC POLYAMIDE THIN-FILM COMPOSITE MEMBRANES FOR SEPARATION OF GAS MIXTURES

(71) Applicant: Saudi Arabian Oil Company, Dhahran (SA)

(72) Inventors: Seung-Hak Choi, Dhahran (SA); Mohammad S. Al-Qahtani, Dhahran (SA); Eyad A. Qasem, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 223 days.

(21) Appl. No.: 15/644,005

(22) Filed: Jul. 7, 2017

(65) Prior Publication Data

US 2019/0009207 A1 Jan. 10, 2019

(51) Int. Cl.
*B01D 53/22* (2006.01)
*B01D 53/26* (2006.01)
(Continued)

(52) U.S. Cl.
CPC ......... *B01D 53/228* (2013.01); *B01D 53/268* (2013.01); *B01D 67/0088* (2013.01);
(Continued)

(58) Field of Classification Search
CPC ...... B01D 53/22; B01D 53/228; B01D 69/10; B01D 69/12; B01D 69/125; B01D 71/52;
(Continued)

(56) References Cited

U.S. PATENT DOCUMENTS 4,902,422 A 2/1990 Pinnau et al.
4,990,165 A * 2/1991 Bikson ................ B01D 53/228
96/10
(Continued)

OTHER PUBLICATIONS

Louie, Jennifer S. et al., "Gas and liquid permeation properties of modified interfacial composite reverse osmosis membranes", Journal of Membrane Science, 2008, 325, pp. 793-800. (Year: 2008).*
(Continued)

*Primary Examiner* — Jason M Greene
(74) *Attorney, Agent, or Firm* — Fish & Richardson P.C.

(57) ABSTRACT

A gas separation membrane for selective separation of hydrogen and helium from gas mixtures containing carbon dioxide includes a porous support layer, an aromatic polyamide layer on the porous support layer, and a coating including a glassy polymer formed on the aromatic polyamide layer. A glass transition temperature of the glassy polymer is greater than 50° C. The gas separation membrane may be formed by contacting a solution including the glassy polymer with an aromatic polyamide layer of a composite membrane and drying the solution to form a coating of the glassy polymer on the aromatic polyamide layer. Separating hydrogen or helium from a gas stream including carbon dioxide includes contacting a gas feed stream including carbon dioxide with the gas separation membrane to yield a permeate stream having a concentration of helium or hydrogen that exceeds the concentration of helium or hydrogen, respectively, in the gas feed stream.

20 Claims, 8 Drawing Sheets

(51) Int. Cl.
*B01D 69/12* (2006.01)
*B01D 71/56* (2006.01)
*B01D 71/64* (2006.01)
*B01D 71/68* (2006.01)
*B01D 71/82* (2006.01)
*B01D 67/00* (2006.01)
*B01D 69/02* (2006.01)
*B01D 71/52* (2006.01)

(52) U.S. Cl.
CPC ............ *B01D 69/02* (2013.01); *B01D 69/12* (2013.01); *B01D 69/125* (2013.01); *B01D 71/56* (2013.01); *B01D 71/64* (2013.01); *B01D 71/68* (2013.01); *B01D 71/82* (2013.01); *B01D 71/52* (2013.01); *B01D 2053/223* (2013.01); *B01D 2256/10* (2013.01); *B01D 2256/22* (2013.01); *B01D 2256/245* (2013.01); *B01D 2257/108* (2013.01); *B01D 2257/11* (2013.01); *B01D 2311/04* (2013.01); *B01D 2325/04* (2013.01); *B01D 2325/20* (2013.01)

(58) Field of Classification Search
CPC ........ B01D 71/56; B01D 71/64; B01D 71/68; B01D 2257/108; B01D 2257/11; B01D 2323/286
See application file for complete search history.

(56) References Cited

U.S. PATENT DOCUMENTS

| | | |
|---|---|---|
| 5,049,167 A | 9/1991 | Castro et al. |
| 7,490,725 B2 | 2/2009 | Pinnau et al. |
| 2004/0050250 A1* | 3/2004 | Pinnau ................ B01D 53/228 95/45 |
| 2005/0077243 A1 | 4/2005 | Pinnau et al. |
| 2009/0277837 A1 | 11/2009 | Liu et al. |
| 2016/0303521 A1 | 10/2016 | Chakraborty et al. |
| 2017/0036171 A1* | 2/2017 | Lienhard ............... B01D 61/50 |
| 2017/0333835 A1* | 11/2017 | Sano ..................... B01D 69/12 |
| 2017/0341017 A1* | 11/2017 | Dutta .................... B01D 69/10 |

OTHER PUBLICATIONS

Louie et al., "Gas and liquid permeation properties of modified interfacial composite reverse osmosis membranes," Journal of Membrane Science, vol. 325, pp. 793-800, Dec. 2008, 8 pages.

Mohammad Reza Moradi et al., "Using PDMS coated TFC-RO membranes for CO2/N2 gas separation: Experimental study, modeling and optimization," Polymer Testing, vol. 56, Dec. 1, 2016, 12 pages.

International Search Report issued in International Application No. PCT/US2018/040864 dated Oct. 9, 2018, 13 pages.

Ekiner et al., "Polyimide hollow fibers for hydrogen/methane separation spinning and properties", Journal of Membrane Science, vol. 53, 1990, 15 pages.

Mohammadi et al., "Gas separation by silicone-coated dry asymmetric aromatic polyamide membranes", Gas Separation and Purification, vol. 9, No. 3, 1995, 7 pages.

Peterson et al., "Novel polyamide composite membranes for gas separation prepared by interfacial polycondensation", Journal of Applied Polymer Science, vol. 63, Issue 12, 1996, 7 pages.

Sridhar et al., "Gas permeation properties of polyamide membrane prepared by interfacial polymerization", Journal of Material Science, vol. 42, 2007, 10 pages.

Gulf Cooperation Council Examination Report issued in GCC Application No. GC 2018-35596 dated Dec. 22, 2019, 5 pages.

* cited by examiner

US 10,682,606 B2

MULTILAYER AROMATIC POLYAMIDE THIN-FILM COMPOSITE MEMBRANES FOR SEPARATION OF GAS MIXTURES

TECHNICAL FIELD

This invention relates to multilayer perm-selective barriers in the form of thin-film composite membranes for selective separation of gas mixtures, in particular for selective separation of hydrogen and helium from gas mixtures containing carbon dioxide.

BACKGROUND

Reverse osmosis (RO) and nanofiltration (NF) membranes are often used to remove salt and other substances from seawater or brackish water. In this membrane-technology filtration method, pressure is applied to the feed solution of a selective membrane such that solvent passes to the low pressure side of the membrane while large molecules and ions are retained on the pressurized side of the membrane. Aromatic polyamide thin-film composite membranes, commonly used for RO and NF membranes, include a thin polyamide film formed on a mesoporous polymeric support via interfacial polymerization. Commercially available RO and NF membranes typically include defects or pores through which gas flow occurs via Knudsen diffusion, and are thus unsuitable for separation of helium or hydrogen from a gas mixture containing carbon dioxide in dry state.

SUMMARY

In a first general aspect, a gas separation membrane includes a porous support layer, an aromatic polyamide layer formed on the porous support layer via interfacial polymerization, and a coating including a glassy polymer formed on the aromatic polyamide layer. A glass transition temperature of the glassy polymer is greater than 50° C.

In a second general aspect, forming a gas separation membrane includes contacting a solution including a glassy polymer with an aromatic polyamide layer of a composite membrane, and drying the solution to form a coating of the glassy polymer on the aromatic polyamide layer of the composite membrane. The aromatic polyamide layer is formed by interfacial polymerization, and the glassy polymer has a glass transition temperature greater than 50° C.

In a third general aspect, a gas separation method includes contacting a gas feed stream including carbon dioxide and at least one of helium and hydrogen with a gas separation membrane to yield a permeate stream and a reject stream. A concentration of helium or hydrogen in the permeate stream exceeds the concentration of helium or hydrogen, respectively, in the gas feed stream. The gas separation membrane includes a porous support layer, an aromatic polyamide layer formed on the porous support layer via interfacial polymerization, and a coating including a glassy polymer formed on the aromatic polyamide layer. A glass transition temperature of the glassy polymer is greater than 50° C.

Implementations of the first, second, and third general aspects may include one or more of the following features.

The glassy polymer may include polyimide, polybenzimidazole, polyphenylsulfone, polyamide, polysulfone, polyphenyl ether, cellulose nitrate, cellulose diacetate, cellulose triacetate, poly(vinyl alcohol), poly(phenylene sulfide), poly(vinyl chloride), polystyrene, poly(methyl methacrylate), polyacrylonitrile, polytetrafluoroethylene, polyetheretherketone, polycarbonate, polyvinyltrimethylsilane, polytrimethylsilylpropyne, poly(ether imide), poly (ether sulfone), polyoxadiazole, poly(phenylene oxide), or a combination or copolymer thereof. The glassy polymer may be functionalized. In some examples, the glassy polymer is sulfonated or halogenated. In one example, the glassy polymer is brominated. The glassy polymer may include at least one of a brominated polyimide, a brominated polysulfone, and a brominated poly(phenylene oxide).

The helium/carbon dioxide ideal selectivity of the membrane is typically between 20 and 70. The helium/nitrogen ideal selectivity of the membrane is typically greater than 70. The helium/methane ideal selectivity of the membrane is typically greater than 70. The helium permeance of the membrane is typically between 5 and 150 GPU ($10^{-6}$ $cm^3_{(STP)}/cm^2/sec/cmHg$) at an operating feed pressure of 50 psia.

Implementations of the second general aspect may include one or more of the following features.

The second general aspect may include dissolving the glassy polymer in a solvent to yield the solution. The solvent may include chloroform, n-hexane, cyclohexane, or a combination thereof. Contacting the solution with the aromatic polyamide layer may include slot die coating, spin coating, dip coating, or spray coating the solution on the aromatic polyamide layer.

Implementations of the third general aspect may include one or more of the following features.

The gas feed stream may include at least 100 ppm by volume of helium, hydrogen, or a combination thereof. The gas feed stream may include up to 90 vol % of helium, hydrogen, or a combination thereof. The permeate stream may include at least 90 vol % of the helium in the gas mixture, at least 90 vol % of the helium in the gas mixture, or both. The product stream may include at least 85 vol % of helium, at least 85 vol % of hydrogen, or at least 85 vol % of a combination of helium and hydrogen.

Membranes described herein allow recovery of helium and hydrogen with increased purity and reduced power consumption.

DETAILED DESCRIPTION

Figure 1A:
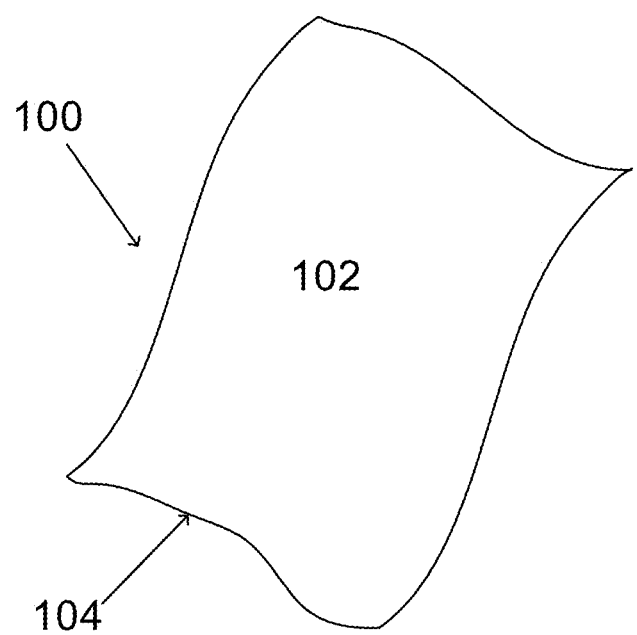
FIG. 1A depicts a multilayer aromatic polyamide thin-film composite flat sheet membrane.
Figure 1B:
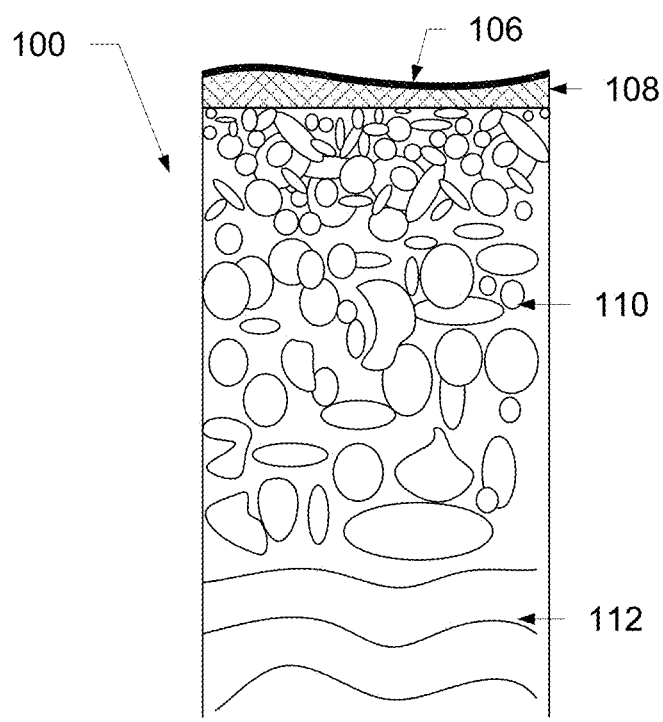
FIG. 1B is a cross-sectional view of the membrane of FIG. 1A.

FIG. 1A depicts multilayer aromatic polyamide thin-film composite membrane 100. As depicted, membrane 100 is in the form of a flat sheet having feed side 102 and permeate side 104. A thickness of membrane 100 is typically in a range of 50 μm to 300 μm. Membrane 100 is advantageously helium- and hydrogen-selective, such that a gas feed stream including helium and/or hydrogen and carbon dioxide provided to feed side 102 of the membrane yields a permeate enriched in helium and/or hydrogen. FIG. 1B depicts a cross section of membrane 100. Membrane 100 includes glassy polymer coating 106, aromatic polyamide layer 108, and porous support 110. In some embodiments, porous support 110 includes substrate 112.

Figure 2A:
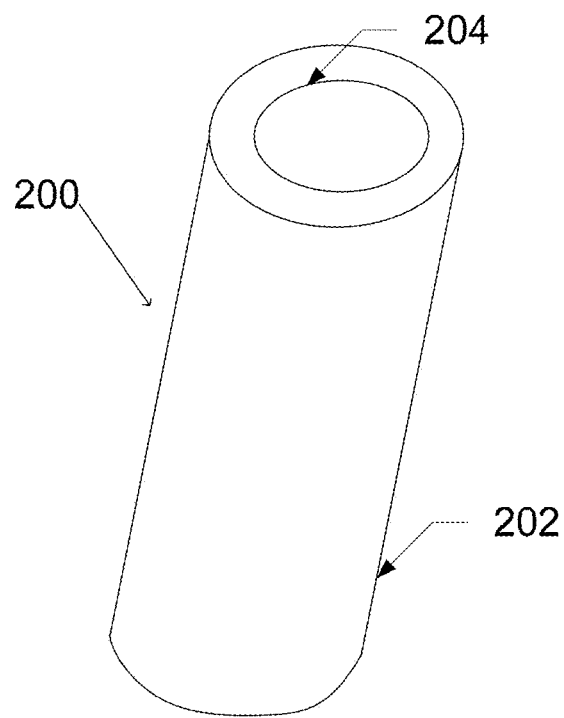
FIG. 2A depicts a multilayer aromatic polyamide thin-film composite hollow fiber membrane.
Figure 2B:
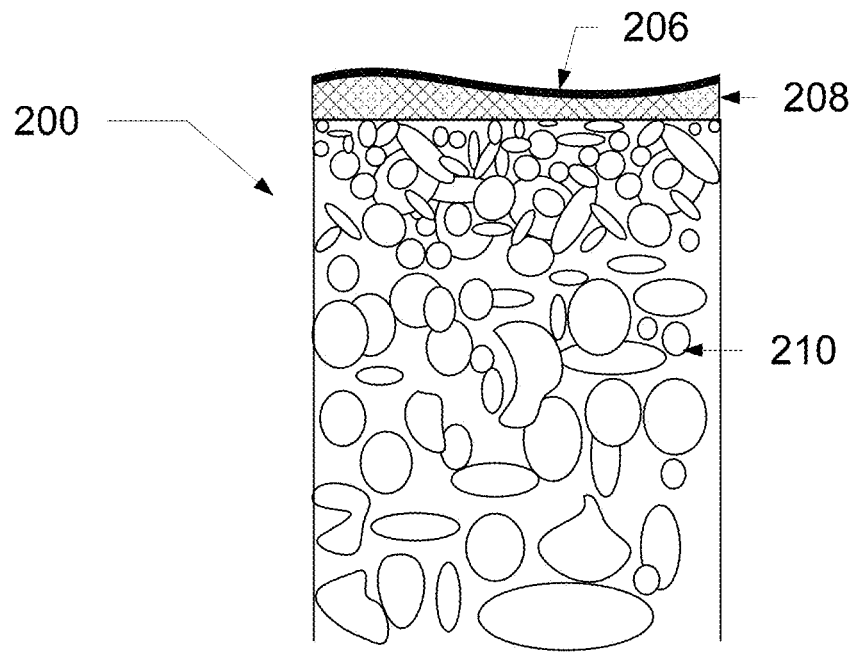
FIG. 2B is a cross-sectional view of the membrane of FIG. 2A.

FIG. 2A depicts multilayer aromatic polyamide thin-film composite hollow fiber membrane 200. As depicted, membrane 200 is in the form of a hollow fiber having feed side 202 and permeate side 204. The outer diameter (OD) of the fiber is typically in a range of 80 μm to 500 μm, and OD/inner diameter (ID) ratio is in a range of 1.5 to 3.5, as appropriate based on the operating pressure. FIG. 2B depicts a cross section of membrane 200. Membrane 200 includes glassy polymer coating 206, aromatic polyamide layer 208, and porous support 210. Hollow fiber type membrane 200 is self-supporting and may not include a substrate.

Porous supports 110 and 210 are mesoporous polymeric membrane supports suitable for microfiltration or ultrafiltration. Porous supports 110 and 210 may be fabricated from polymers such as polyimide, polybenzimidazole, polyphenylsulfone, polyamide, polysulfone, polyphenyl ether, cellulose nitrate, cellulose diacetate, cellulose triacetate, polypropylene, polyethylene, polyvinylidene fluoride, poly (phenylene sulfide), poly(vinyl chloride), polystyrene, poly (methyl methacrylate), polyacrylonitrile, polytetrafluoroethylene, polyetheretherketone, polycarbonate, polyvinyltrimethylsilane, polytrimethylsilylpropyne, poly(ether imide), poly(ether sulfone), polyoxadiazole, poly (phenylene oxide), or a combination or copolymer thereof. A thickness of porous support 110 is typically in a range of 50 μm to 200 μm. A thickness of porous support 210 is typically in a range of 30 μm to 100 μm. Surface pores in porous supports 110 and 210 are nonuniform and have dimensions in a range of 20 nm to 100 nm. In some embodiments, porous support 110 has a backing layer, such as porous substrate 112, such that permeate exits membrane 100 through porous support 110 or porous substrate 112. Porous substrate 112 is fabricated from a flexible material, such as fabric. A thickness of porous substrate 112 is typically in a range of 50 μm to 100 μm and the pore size is typically in a range of 5 μm to 10 μm.

Aromatic polyamide layers 108 and 208 are a crosslinked aromatic polyamide layer formed on porous support 110 and 210, respectively, by interfacial polymerization. In interfacial polymerization, a reaction occurs between reactive components at an interface of two immiscible solvents. In one example, porous support 110 or 210 is saturated with an aqueous solution containing a monomeric arylene polyamine, such as m-phenylenediamine, by immersion or spraying. After saturation, porous support 110 or 210 is immersed in a water-immiscible solvent in which a monomeric acyl halide, such as trimesoyl chloride, has been dissolved. Interfacial polymerization is initiated in situ, forming aromatic polyamide layer 108 or 208 directly on porous support 110 or 210, respectively. The polyamide layer and the porous support are dried to yield a composite membrane. Aromatic polyamide layer 208 is formed by procedures exampled above. A thickness of polyamide layers 108 and 208 is typically in a range of 20 nm to 200 nm.

Glassy polymer coatings 106 and 206 are formed on aromatic polyamide layers 108 and 208, respectively. In some embodiments, glassy polymer coatings 106 and 206 are formed on aromatic polyamide layer 108 and 208, respectively, by slot die coating, spin coating, dip coating, or spray coating a solution including a glassy polymer on the aromatic polyamide layer, effectively plugging pores or defects in aromatic polyamide layers 108 and 208, respectively, and yielding a multilayer aromatic polyamide thin-film composite membrane suitable for gas separation. A thickness of glassy polymer coating 106 and 208 is in a range of 10 nm to 1 μm. Forming glassy polymer coatings 106 and 206 on aromatic polyamide layers 108 and 208, respectively, is referred to as "caulking," and the resulting multilayer aromatic polyamide thin-film composite membrane is referred to as a "caulked" membrane.

Glassy polymer coatings 106 and 206 include a glassy polymer having a glass transition temperature greater than 50° C. In some embodiments, glassy polymer coatings 106 and 206 include a glassy polymer having a glass transition temperature greater than 100° C. or greater than 150° C. Suitable glassy polymers include polyimide, polybenzimidazole, polyphenylsulfone, polyamide, polysulfone, polyphenyl ether, cellulose nitrate, cellulose diacetate, cellulose triacetate, poly(vinyl alcohol), poly(phenylene sulfide), poly (vinyl chloride), polystyrene, poly(methyl methacrylate), polyacrylonitrile, polytetrafluoroethylene, polyetheretherketone, polycarbonate, polyvinyltrimethylsilane, polytrimethylsilylpropyne, poly(ether imide), poly(ether sulfone), polyoxadiazole, poly(phenylene oxide), or a combination or copolymer thereof. In some embodiments, the glassy polymer is functionalized. Functionalized glassy polymers include sulfonated glassy polymers and halogenated glassy polymers, such as brominated glassy polymers. Examples of suitable glassy polymers include brominated polyimide, brominated polysulfone, and brominated poly(phenylene oxide).

Figure 3:
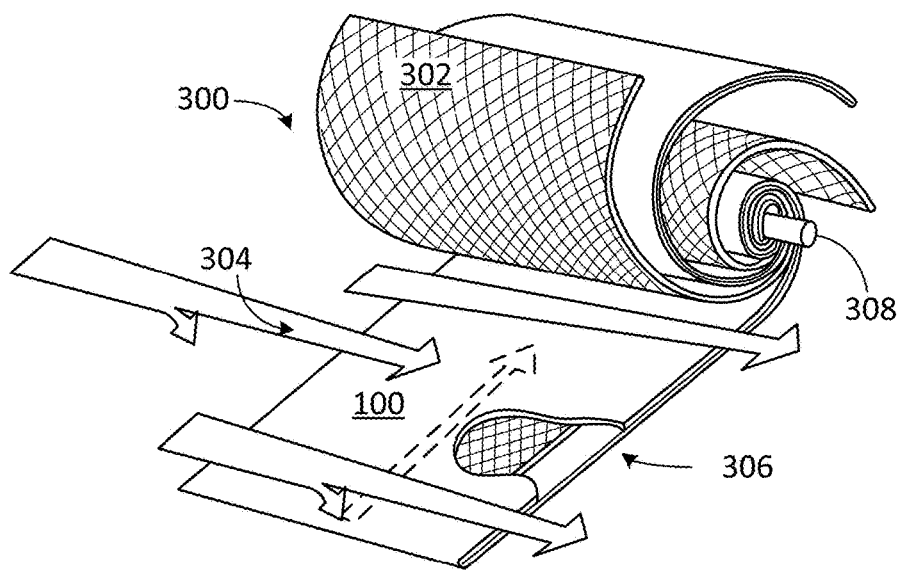
FIG. 3 depicts a spiral wound module configuration with the membrane of FIG. 1A.

In some embodiments, membrane 100 is implemented in a spiral wound module. FIG. 3 is an exploded view of spiral wound module 300. Spiral wound module 300 includes membranes 100 and spacers 302 between membranes 100. A feed mixture is provided to first end 304 of spiral wound module 300, and retentate exits second end 306 of the spiral wound module. Permeate exits spiral wound module 300 via central opening 308.

Figure 4:
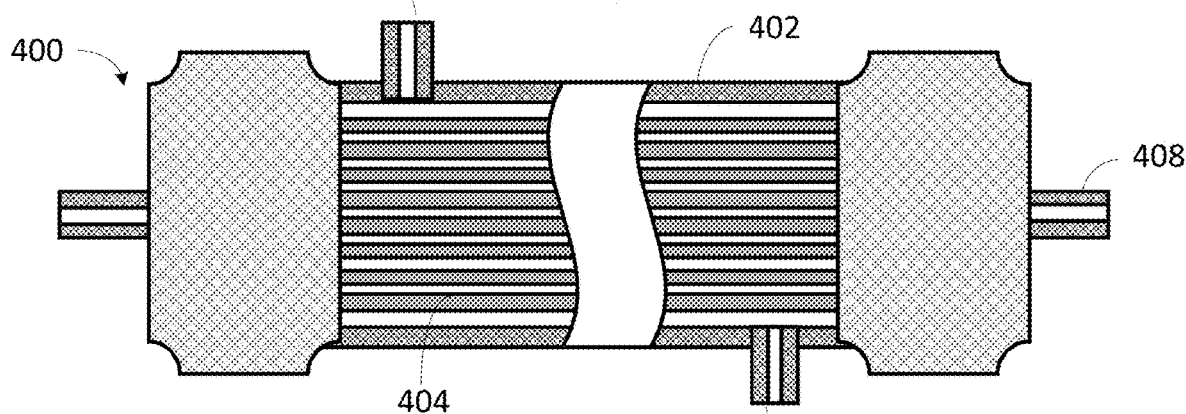
FIG. 4 depicts a hollow fiber module configuration with the membrane of FIG. 2A.

In some embodiments, membrane 200 is implemented in a hollow fiber membrane module. FIG. 4 is a cross-sectional view of hollow fiber membrane module 400 with housing 402. Hollow fiber membranes 404 are contained in housing 402. In some embodiments, feed gas is provided to hollow fiber membrane module 400 outside hollow fiber membranes 404 ("outside-in") via inlet 406. Permeate and retentate exit housing 402 via outlet 408 and 410, respectively. In certain embodiments, feed gas is introduced inside hollow fiber membranes 404 ("inside-out") through outlet 408 and the permeate exits housing 402 through inlet 406, outlet 410, or both. Sweep gas or permeate may be provide to hollow fiber membrane module 400 via inlet 412.

Figure 5:
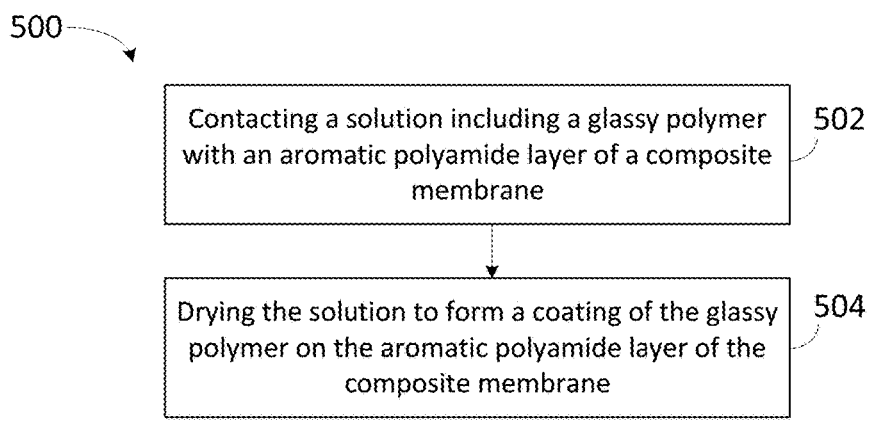
FIG. 5 is a flow chart for a process for forming a glassy polymer coating on an aromatic polyamide composite membrane.

FIG. 5 is a flow chart of process 500 for forming a glassy polymer coating on an aromatic polyamide layer of a composite membrane. In 502, a solution including a suitable glassy polymer as described herein is contacted with an aromatic polyamide layer of a composite membrane. The solution includes a glassy polymer dissolved in an appropriate solvent. The concentration of glassy polymer is in a range of 0.2 wt % to 5 wt %. The solvent may be organic or inorganic. Based on solubility of the glassy polymer, suitable organic solvents include chloroform, tetrahydrofuran, acetone, benzene, dichloromethane, n-hexane, cyclohexane, pentane, and toluene. Suitable inorganic solvents include sulfuryl chloride and hydrogen fluoride. A viscosity of the solution is typically in a range of 0.2 to 500 centipoise (cP) at 25° C. In 504, the solution is dried to form a coating/caulking layer of the glassy polymer on the aromatic polyamide layer of a composite membrane. After coating, the membrane is dried in a vacuum oven preheated 5° C. to 10° C. higher than the boiling point of the solvent and kept in the oven for 1 hour under vacuum.

Permeation and separation properties of the multilayer aromatic polyamide thin-film composite membranes described herein have been characterized by pure gas and mixed gas containing helium, methane, carbon dioxide, and nitrogen. The membranes are helium- and hydrogen-selective, such that providing a gas feed stream including carbon dioxide and hydrogen, helium, or both, to the feed side of the membrane yields a permeate enriched in hydrogen, helium, or both, respectively. "Ideal selectivity" of one gas with respect to another is defined as the ratio of pure gas permeabilities of the gases. "Permeability," determined experimentally, is defined as the transport flux of material through the membrane per unit driving force per unit membrane thickness. A commonly used unit for gas separation (the "barrer") is defined as: 1 barrer=$10^{-10}$ ($cm^3$ @ STP·cm)/($cm^2$·s·cm-Hg), where $cm^3$ @STP/$cm^2$·s refers to the volumetric trans-membrane flux of the diffusing species in terms of standard conditions of 0° C. and 1 atm; cm refers to the membrane thickness; and cm-Hg refers to the trans-membrane partial pressure driving force for the diffusing species, where the driving force is the pressure difference across the membrane. The permeability of a gas is a product of the sorption (or partition) coefficient and the permeate diffusion coefficient. The sorption coefficient is an equilibrium term linking the concentration of a permeating component in a fluid phase with its concentration in the membrane polymer phase. It accounts for the solubility of the component in the membrane. The diffusion coefficient is a kinetic term that reflects the effect of the surrounding environment on the molecular motion of the permeating component. It accounts for the diffusion of the component through the membrane. Permeance is defined as the ratio of the permeability to the membrane thickness. A common unit for permeance ("gas permeance unit") is expressed as: 1 GPU=$10^{-6}$ $cm^3_{(STP)}$/$cm^2$·s·cm-Hg)=$3.3 \times 10^1$ mol/($m^2$·s·Pa).

Membranes described herein demonstrate ideal selectivity of helium over carbon dioxide (helium/carbon dioxide) in a range of 20 to 70. The helium/nitrogen ideal selectivity and helium/methane ideal selectivity of the membranes are both greater than 70. In some embodiments, the helium/nitrogen ideal selectivity and helium/methane ideal selectivity is up to or greater than 2000. The helium permeance of the membrane is in a range of 5 to 150 GPU at an operating feed pressure of 50 psia.

EXAMPLES

Figure 6A:
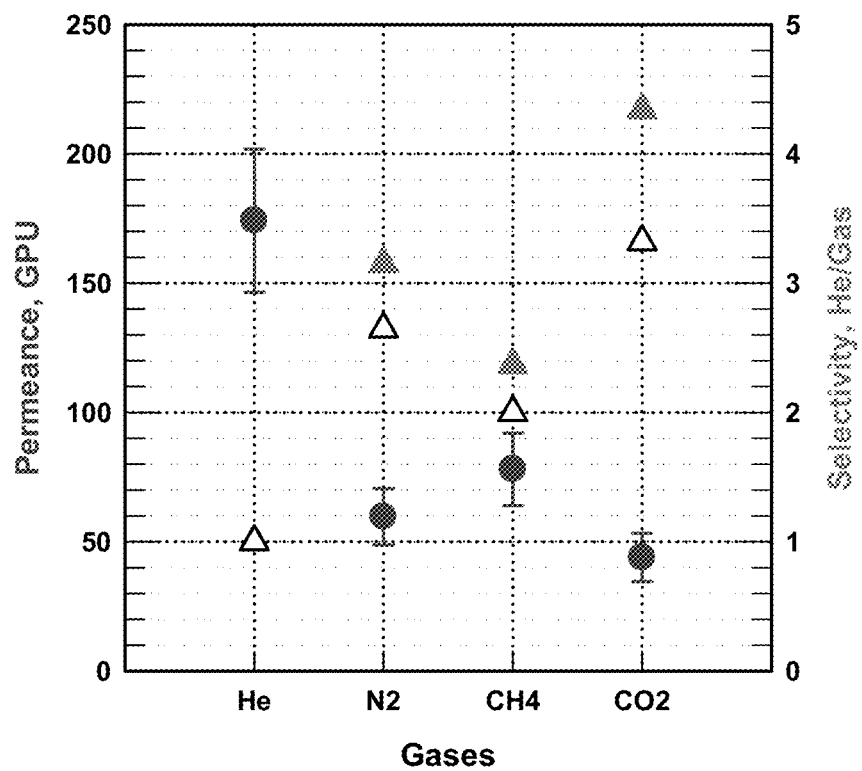
FIG. 6A shows gas permeance and ideal selectivity of commercially available thin-film composite aromatic polyamide RO membranes.
Figure 6B:
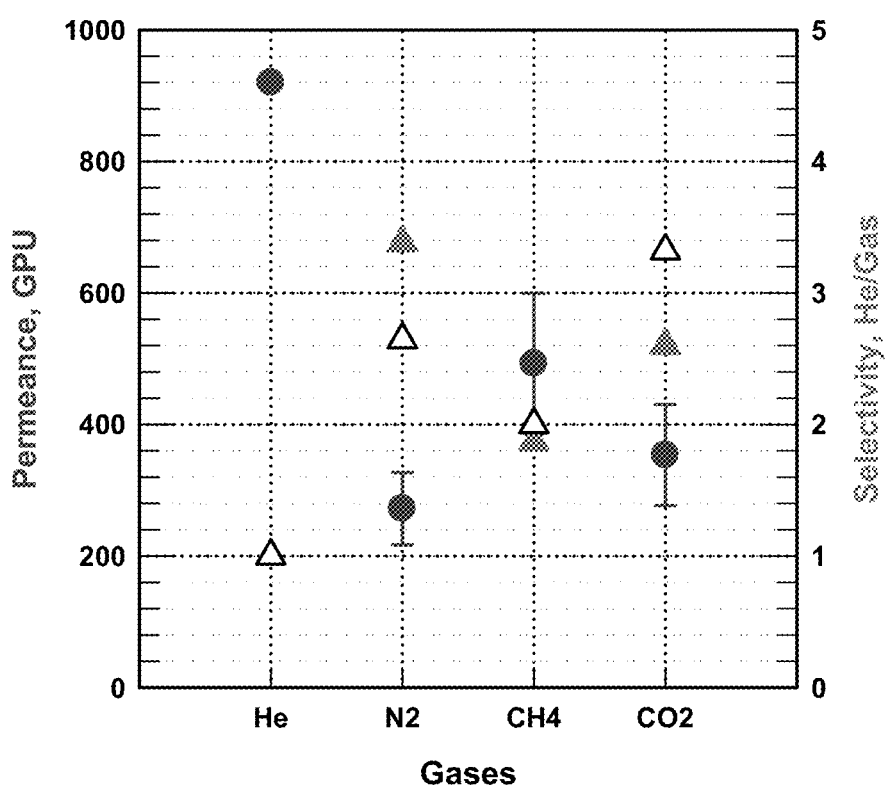
FIG. 6B shows gas permeance and ideal selectivity of commercially available thin-film composite aromatic polyamide NF membranes.

As confirmed by gas permeation experiments, commercially available aromatic polyamide thin-film composite membranes are porous (or defective). For instance, as shown in FIGS. 6A and 6B, the average ideal selectivity of He/$CO_2$ through 4 commercial RO membranes and 2 commercial NF membranes was in the range of 2.3-3.8 (filled triangles), consistent with Knudsen flow characteristics (open triangles). The four commercial membranes were RE8040-SHN (Woongjin Chemical, (currently Toray Advanced Materials Korea Inc.), SWC4 (Hydranautics, currently Nitto group), and LG SW 400 SR and LG SW 400 ES (LG Chemical, Ltd.). The two commercial NF membranes were NE8040-90 (Woongjin Chemical) and NF 4 (Sepro Membranes Inc.). That is, the aromatic polyamide thin-film layers of these membranes are not perfectly dense, but rather have some defects, through which gas flow primarily or exclusively occurs via Knudsen diffusion. As such, these membranes are not suitable for separation of helium or hydrogen from a mixture including other gases, such as nitrogen, methane, and carbon dioxide.

Table 1 lists helium permeability and He/$CO_2$ selectivity for polypyrrolone and polyimide membrane materials and selected commercially available membrane materials. As seen in Table 1, with the exception of NAFION-117 membranes, these materials generally have low ideal selectivity for He/$CO_2$. NAFION-117 membranes, known to have relatively low He permeability and good selectivity for He/$CO_2$, was selected as a comparative example to provide a benchmark for the performance of the other membrane materials in Table 1. As understood by one of ordinary skill in the art, however, NAFION is cost-prohibitive and has limited stability upon exposure to water vapor.

TABLE 1

Helium permeability and He/$CO_2$ selectivity for various membrane materials

| Membrane materials | He permeability [Barrer*] | Selectivity [He/$CO_2$] |
|---|---|---|
| CYTOP | 170 | 4.86 |
| HYFLON AD (solution cast) | 369 | 2.54 |
| HYFLON AD60 | 390 | 3 |
| HYFLON AD80 | 430 | 2.87 |
| Poly(trimethylsilylpropyne) | 5250 | 0.187 |
| Poly(trimethylsilylpropyne) | 6500 | 0.196 |
| NAFION-117 | 40.9 | 16.83 |
| HYFLON AD60X (melt pressed) | 405 | 6.43 |
| HYFLON AD60X (solution cast) | 455 | 5.67 |
| HYFLON ZD60X (solution cast) | 476 | 6.18 |
| HYFLON AF-2400 | 3650 | 0.923 |

*Barrer: $10^{-10}_{(STP)} \times cm/(cm^3 \times sec \times cmHg)$

Figure 7A:
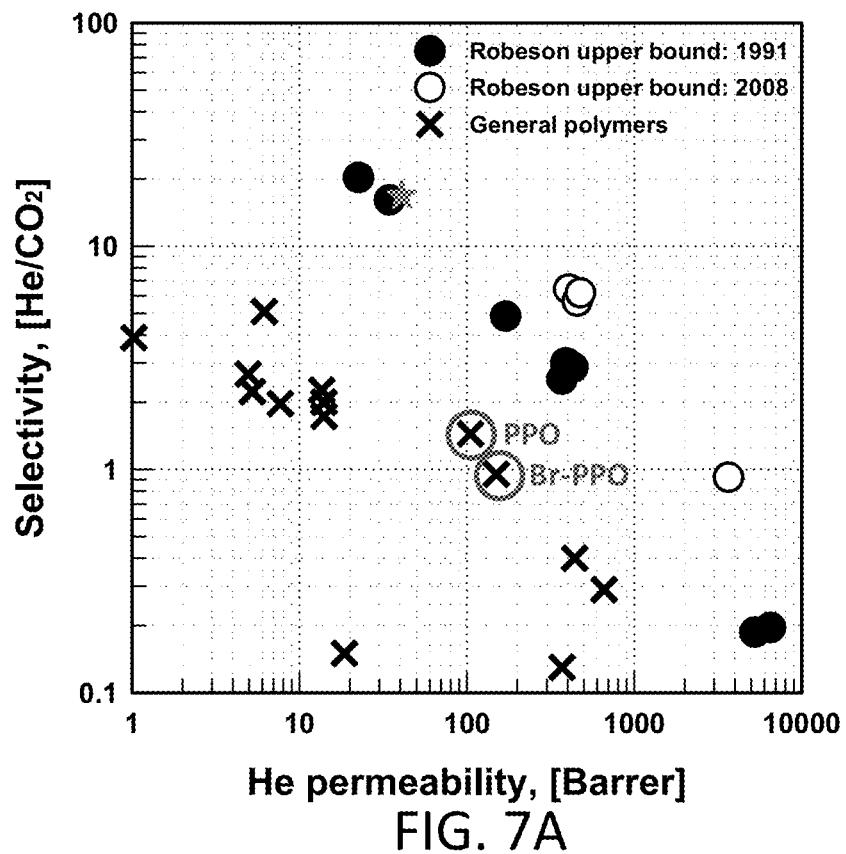
FIG. 7A shows helium permeability and ideal selectivity of $He/CO_2$ through commonly used polymeric material in the gas separation industry with Robeson upper bound (1991 and 2008).
Figure 7B:
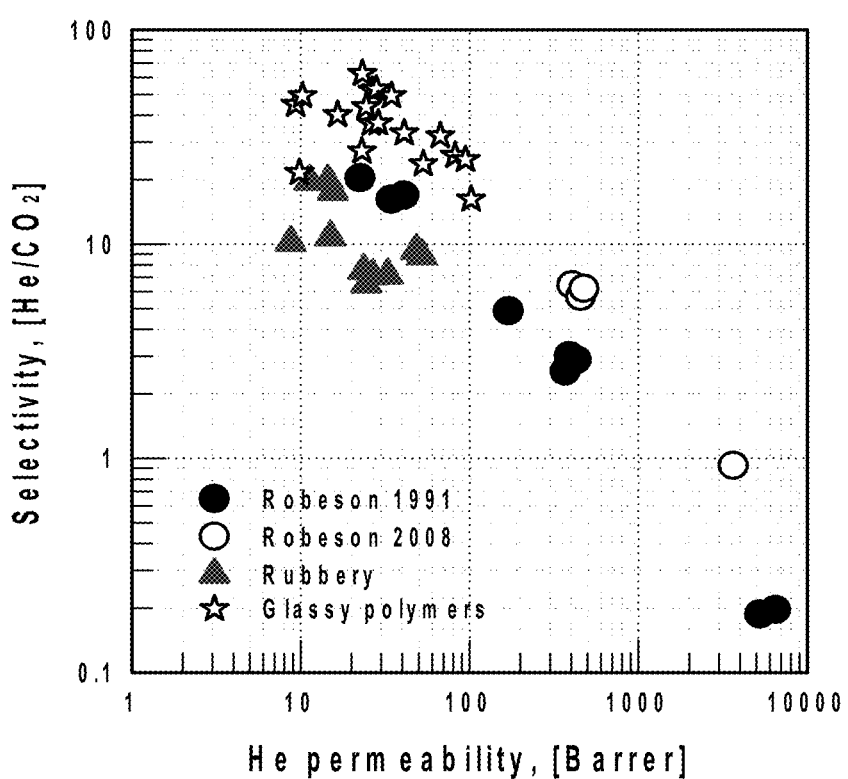
FIG. 7B shows the experimental results obtained for caulked thin-film composite (TFC) polyamide membranes described herein and plotted with Robeson upper bounds for comparison.

As shown in FIG. 7A, the He permeability and ideal selectivity of He/$CO_2$ through polymeric materials commonly used in the gas separation industry (X—general glassy polymers, including PPO and Br-PPO, as indicated) have low He/$CO_2$ selectivity (in a range in 0.2 to 5), while the permeability is in the range of 1 to 700 Barrer. indicated by A few materials, such as HYFLON and CYTOP, as well as NAFION 117 (filled star), fall along the 1991 Robeson upper bound (filled circles). Thus, reverse osmosis and nanofiltration membranes made of these materials have poor He/$CO_2$ selectivity. FIG. 7B shows the ideal selectivity of He/$CO_2$ through the polymeric materials of FIG. 7A after the polymeric materials were caulked with rubbery polymers and glassy polymers. Robeson upper bounds are plotted for reference (Robeson 1991: filled circles; Robeson 2008: open circles). The membranes caulked with rubbery polymers are shown as filled triangles. The membranes caulked with glassy polymers are shown as open stars. As seen with respect to FIG. 7B, after defects (or pores) in the membrane materials were caulked with a glassy polymer as described herein, the gas selectivity of these membranes increased substantially.

Example 1

A caulked aromatic polyamide thin-film composite membrane was fabricated by dissolving 3 wt % of polyphenylene oxide (PPO, Sabic 6130) in chloroform (≥99.8%, Sigma-Aldrich) to form a solution. The solution was spin coated (3000 rpm, 10 sec, 1 mL injection) onto a commercially available aromatic polyamide thin-film composite membrane (LG SW 400 SR from LG Chemical) to form a glassy polymer coating on each membrane. After coating, the membrane was placed in a vacuum oven set to a temperature of 5° C. to 10° C. greater than the boiling point of the solvent and dried for one hour. The caulking layer was less than 1 μm thick.

Example 2

A caulked aromatic polyamide thin-film composite membrane was prepared by the method described in Example 1, with 3 wt % brominated PPO (Br-PPO, in-house brominated PPO, bromination degree 60%) in chloroform coated on a commercially available aromatic polyamide thin-film composite membrane (LG SW 400 SR from LG Chemical).

Example 3

A caulked aromatic polyamide thin-film composite membrane was prepared by the method described in Example 1, with 3 wt % polyimide (in-house) in chloroform coated on a commercially available aromatic polyamide thin-film composite membrane (LG SW 400 SR from LG Chemical).

Example 4

A caulked aromatic polyamide thin-film composite membrane was prepared by the method described in Example 1, with NAFION 117 (Sigma-Aldrich, ~5 wt % in a mixture of lower aliphatic alcohols and water) coated on a commercially available aromatic polyamide thin-film composite membrane (LG SW 400 SR from LG Chemical).

Example 5

A caulked aromatic polyamide thin-film composite membrane was prepared by the method described in Example 1, with 3 wt % PPO in chloroform coated on a commercially available aromatic polyamide thin-film composite membrane (RE8040-SHN from Woongjin Chemical, currently Toray Advanced Materials Korea Inc.).

Example 6

A caulked aromatic polyamide thin-film composite membrane was prepared by the method described in Example 1, with 3 wt % polysulfone (PSF, UDEL P-3500 LCD MB7, Mw=77,000-83,000 g/mol, Solvay) in chloroform coated on a commercially available aromatic polyamide thin-film composite membrane (LG SW 400 SR from LG Chemical).

Example 7

A caulked aromatic polyamide thin-film composite membrane was prepared by the method described in Example 1, with 3 wt % polysulfone (PSF) in chloroform coated on a commercially available aromatic polyamide thin-film composite membrane (LG SW 400 SR from LG Chemical).

Comparative Example 1

A comparative membrane was prepared by the method described in Example 1, with NAFION 117 (Sigma-Aldrich, ~5 wt % in a mixture of lower aliphatic alcohols and water) coated on a commercially available polyacrylonitrile ultrafiltration membrane (PAN 350 UF support from Sepro Membranes).

Comparative Example 2

A comparative membrane was prepared by the method described in Example 1, with 5 wt % PDMS (SYLGARD 184 from Dow Corning) in n-hexane (97%, Sigma Aldrich) coated on a commercially available aromatic polyamide thin-film composite membrane (LG SW 400 SR from LG Chemical).

Figure 8:
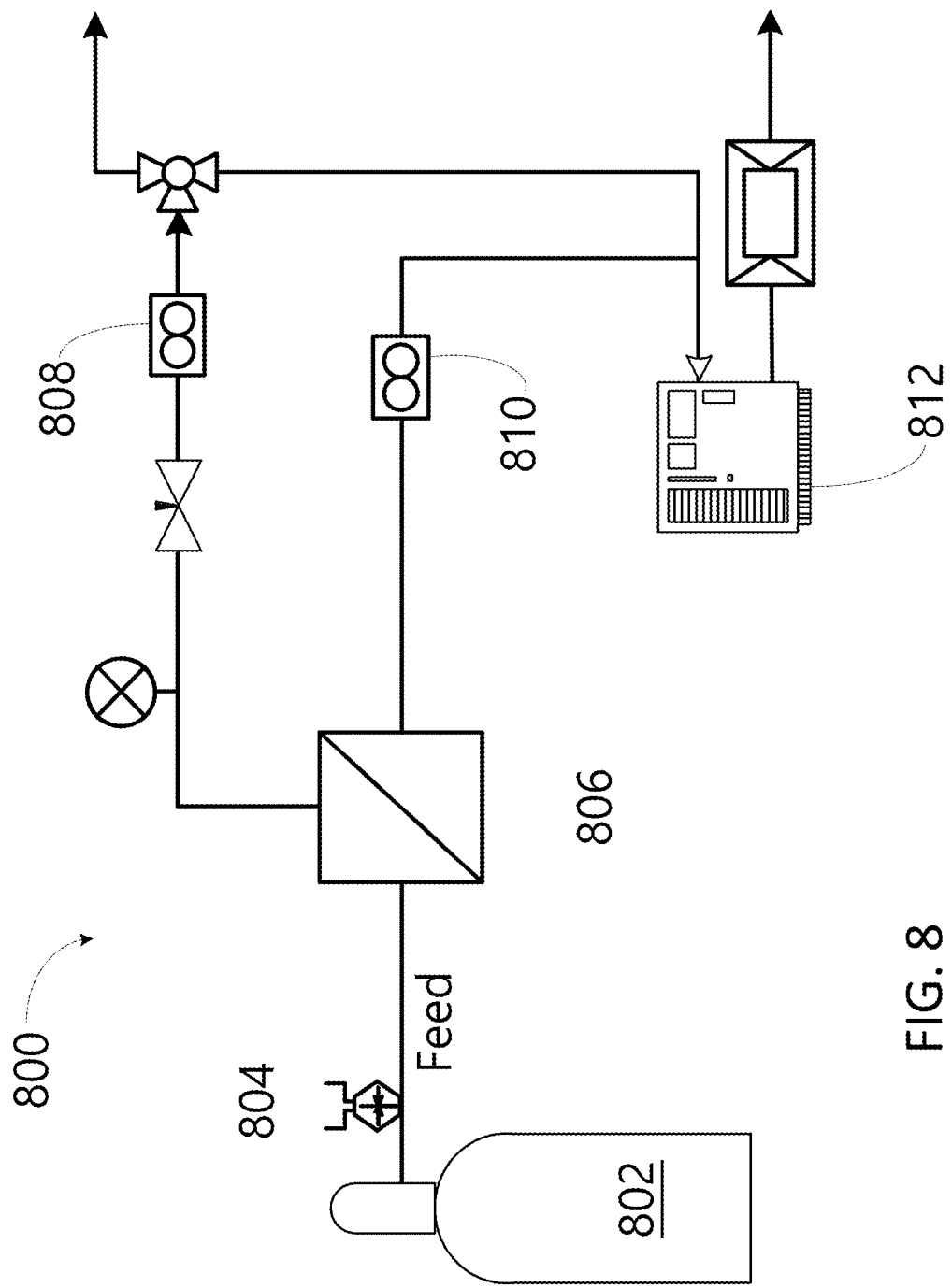
FIG. 8 depicts an experimental setup used to characterize membrane permeation properties with pure gas and separation properties with mixed gas.

As shown in Table 2, the NAFION composite membrane (Comparative Example 1) showed helium permeance of 33.4 GPU and $He/CO_2$ selectivity of 15, while thin-film composite membranes with a glassy polymer caulking showed superior $H_2/CO_2$ selectivity, as depicted in FIG. 7B. Permeation and separation properties of the membranes were analyzed using system 800 depicted in FIG. 8 with pure gases and a gas mixture containing 0.12 vol % He, 4.4 vol % $CO_2$, 28.1 vol % $N_2$, and the balance $CH_4$. In system 800, test gas 802 is fed through pressure regulator 804 and provided to membrane module 806, which houses a membrane to be tested. Retentate and permeate from the membrane module pass through mass flow meters 808 and 810, respectively and are combined to yield a mixture, which is provided to gas chromatograph 812 for evaluation. For pure gas permeance measurements, the operating feed pressure was maintained at 50 psia. The ideal selectivity was calculated over helium. Permeance and ideal selectivity of the membranes are listed in Table 2. The actual separation properties of the caulked multilayer thin-film composite membranes and the comparative membranes were compared with a mixed gas permeation test (0.12 vol % He, 4.4 vol % $CO_2$, 28.1 vol % $N_2$, and the balance $CH_4$) at operating pressures up to 400 psig.

TABLE 2

Permeance and ideal selectivity of membranes

| | Permeance (GPU) | | | | | Ideal-selectivity (He/Gas) | | | | |
|---|---|---|---|---|---|---|---|---|---|---|
| | Nafion117 | | LG1[3] | | | Nafion117 | | LG1[3] | | |
| Gas | composite[1] | PPO/CSM[2] | Nafion ®-117 | PPO | Br-PPO | composite[1] | PPO/CSM[2] | Nafion ®-117 | PPO | Br-PPO |
| He | 33.4 | 8.25 | 32.0 | 21.6 | 27.6 | 1.00 | 1.00 | 1.00 | 1.00 | 1.00 |
| $N_2$ | 0.65 | 0.05 | 0.35 | 0.02 | 0.018 | 51 | 150 | 94.1 | 1080 | 1533 |

TABLE 2-continued

Permeance and ideal selectivity of membranes

| | Permeance (GPU) | | | | | Ideal-selectivity (He/Gas) | | | | |
|---|---|---|---|---|---|---|---|---|---|---|
| | Nafion117 | | LG1[3] | | | Nafion117 | | LG1[3] | | |
| Gas | composite[1] | PPO/CSM[2] | Nafion ®-117 | PPO | Br-PPO | composite[1] | PPO/CSM[2] | Nafion ®-117 | PPO | Br-PPO |
| $CH_4$ | 0.69 | 0.07 | 0.57 | 0.017 | 0.016 | 48 | 118 | 56.1 | 1270 | 1725 |
| $CO_2$ | 2.2 | 0.205 | 1.36 | 0.48 | 0.51 | 15 | 40.2 | 23.5 | 45 | 54.1 |

[1]Nafion ®-177 coated on PAN 350 support:
[2]CSM (RE8040-SHN): Woongjin Chemical seawater desalination TFC RO:
[3]LG1: LG Chemical seawater desalination TFC RO (product number: LG SW 400 SR)

Figure 9A:
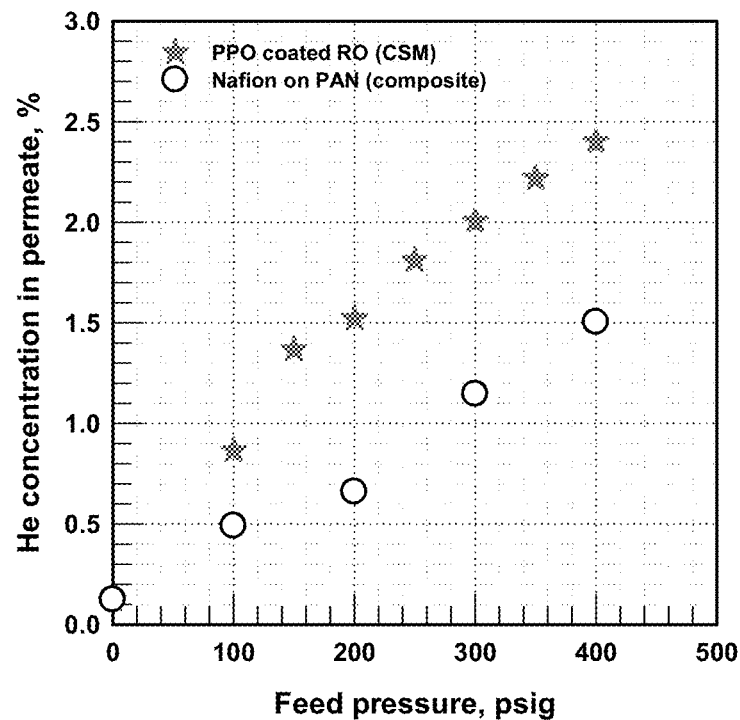
FIG. 9A shows comparative helium enrichment performance for a caulked TFC polyamide membrane and a reference composite membrane.
Figure 9B:
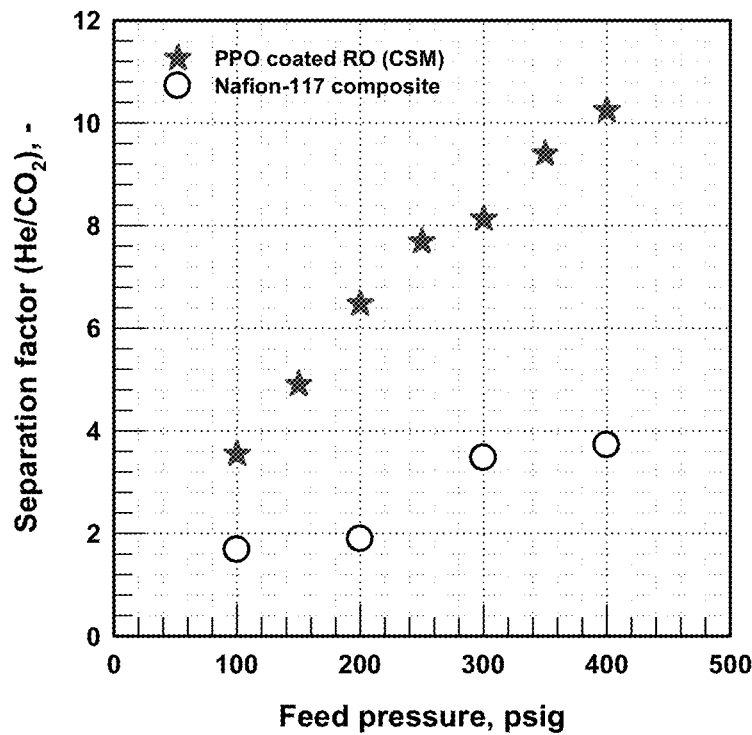
FIG. 9B shows separation factors for a caulked TFC polyamide membrane and a reference composite membrane.

As shown in Table 2, the PPO-coated CSM (RE8040-SHN from Woongjin) membrane (Example 5) had a helium permeance of 8.25 GPU and a He/$CO_2$ ideal selectivity of 40.2. The LG SW 400 SR membranes coated with NAFION-117, PPO, and Br-PPO (Examples 4, 1, and 2, respectively) demonstrated a helium permeance of 32.0 GPU, 21.6 GPU, and 27.6 GPU, respectively, and a He/$CO_2$ ideal selectivity of 23.5, 45, and 54.1, respectively. FIG. 9A shows helium concentration in the permeate (vol %) versus feed pressure (psig). FIG. 9B shows helium/carbon dioxide separation factor (the permeability ratio of two gases) versus feed pressure (psig). The filled stars show results from the PPO-coated CSM Woongjin membrane (Example 5), and the open circles show results from the NAFION-117/PAN composite membrane (Comparative Example 1). As seen from FIGS. 9A and 9B, the PPO-coated CSM membrane (Example 5) has a greater helium concentration in the permeate as well as a higher selectivity over carbon dioxide than the NAFION-117/PAN composite membrane (Comparative Example 1).

Simulations were performed by Saudi Aramco Research & Development Center developed "Industrial Membrane Process Simulator" under the HYSYS platform for an Aspen HYSYS simulation to assess the performance of commercially available membranes (CYTOP, HYFLON, polyimide, NAFION-117/PAN) as well as caulked membranes prepared as described in the Examples herein (NAFION-117/LG1, PPO/CSM, and Br-PPO/LG1).

Figure 10:
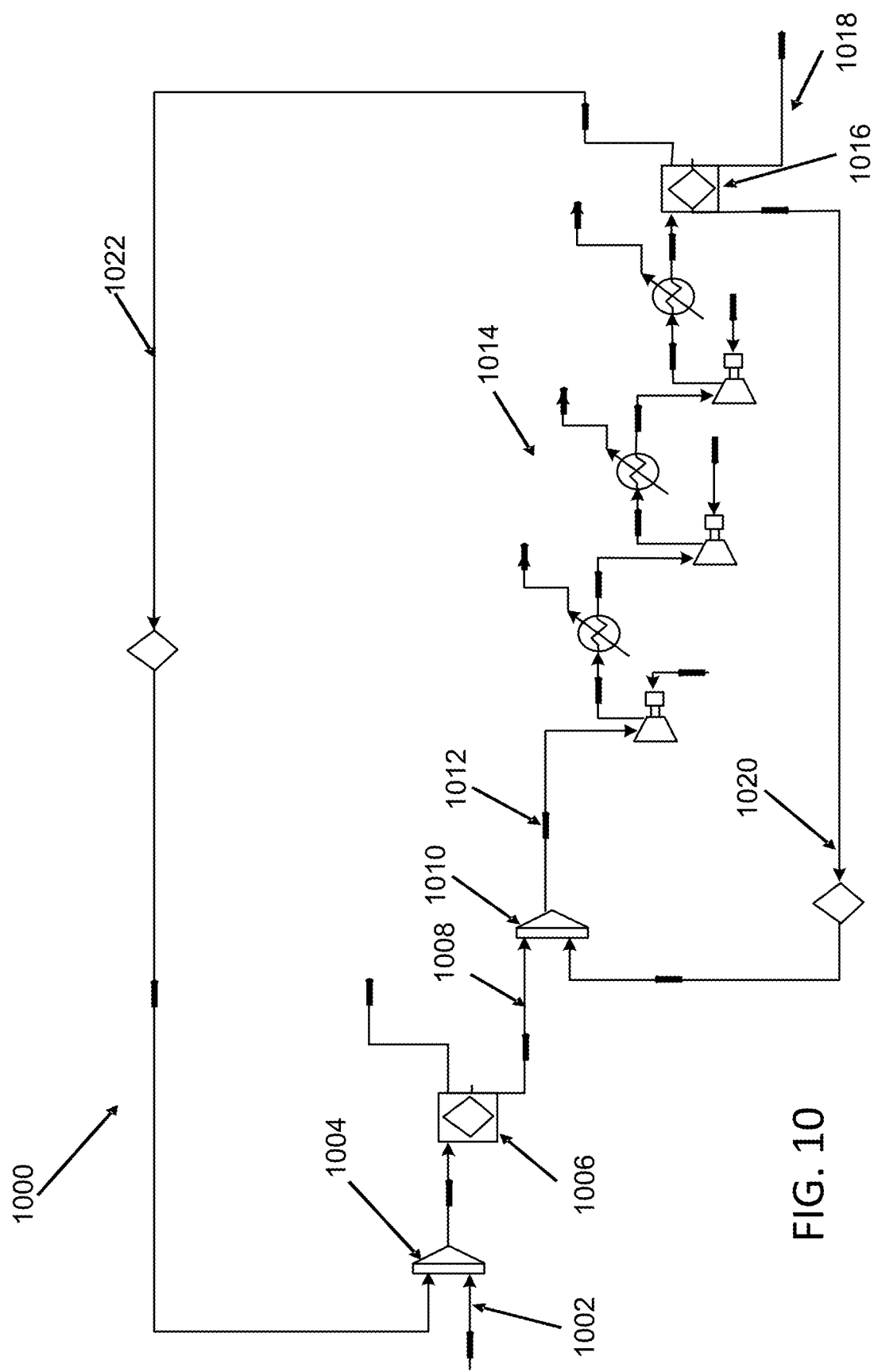
FIG. 10 is a process flow diagram for a membrane simulation demonstrating helium enrichment with various membrane materials.

FIG. 10 depicts process flow system 1000 for the simulation. As depicted in FIG. 10, feed gas 1002 is provided mixer 1004 and then to first stage membrane unit 1006. The membrane area in first stage membrane unit 1006 is selected to recover 90% of the helium in the feed gas. Permeate stream 1008 from first stage membrane unit 1006 is provided to mixer 1010. From mixer 1010, permeate 1012 is provided to compression system 1014 and then to second stage membrane unit 1016. The membrane area in second stage membrane unit 1016 is selected to maximize the helium purity in permeate stream 1018. Permeate from second stage membrane unit 1016 is split into product stream 1018 and recycle stream 1020. The split ratio is set to meet helium quality requirements in product stream 1018. Recycle stream 1020 is combined with permeate stream 1008 in mixer 1010, and reject stream 1022 from second stage membrane unit 1016 is combined with feed gas 1002 in mixer 1004. Table 3 lists results of the process simulation.

TABLE 3

Process simulation comparison

| Membrane material | Compression power (Mw) | Helium purity (vol. %) | Helium rich stream size (MMSCFD) |
|---|---|---|---|
| CYTOP | 27.7 | 10 | 6.1 |
| HYFLON | 28.4 | 10 | 5.9 |
| Polyimide | 25.7 | 10 | 5.7 |
| Nafion-117 composite | 13.7 | 43 | 1.4 |
| Nafion-117/LG SW 400 SR | 11.2 | 45 | 1.3 |
| PPO/Woongjin | 9.9 | 85 | 0.7 |
| Br-PPO/LG SW 400 SR | 8.5 | 86 | 0.7 |

For commercially available membrane materials (CYTOP, HYFLON, and polyimide), which have low He/$CO_2$ selectivity, both helium and carbon dioxide permeate through the membrane together and due to the high permeability of helium and $CO_2$ compared to that of $N_2$ and $CH_4$. That is, the concentration of $CO_2$ and He in the permeate from the first membrane unit is higher than the concentration of $CO_2$ and He in the feed gas. In addition, the partial pressure (or concentration) of $CO_2$ in the feed gas (4.4 vol %) is much higher than that of He (0.12 vol %), leading to enrichment of $CO_2$ in the permeate stream of the first stage. Eventually, high $CO_2$ concentration will further reduce the selectivity of He/$CO_2$ due at least in part to the plasticization effect. Finally, helium purity is decreased and the helium rich stream size is large, thus requiring more energy to compress the permeate stream from the first stage to feed to second stage membrane unit. For instance, the permeate stream size of the CYTOP, HYFLON, and polyimide membranes is 6.1 MMSCFD, 5.9 MMSCFD, and 5.7 MMSCFD, respectively. In addition, high compressor power (more than 25 MW) was required for the CYTOP, HYFLON, and polyimide membranes. The PPO-CSM and Br-PPO LG1 composite membranes fabricated as described herein demonstrate high selectivity for helium over nitrogen and methane as well as $CO_2$. It follows that helium selectively permeates through these membrane, resulting in a small helium rich stream size (0.7 MMSCFD) and a high concentration of helium (85 vol % and 86 vol %, respectively) with low compression power (9.9 MW and 8.5 MW, respectively).

Definitions

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000, 1" is equivalent to "0.0001." All publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the described methods, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" can allow for a degree of variability in a value or range, for example, within 10%, within 5%, or within 1% of a stated value or of a stated limit of a range.

What is claimed is:

1. A gas separation membrane comprising:
   a hollow fiber membrane comprising:
      a porous support layer;
      an aromatic polyamide layer formed on the porous support layer via interfacial polymerization; and
      a coating comprising a glassy polymer formed on the aromatic polyamide layer and that plugs defects in the aromatic polyamide layer, wherein a glass transition temperature of the glassy polymer is greater than 50° C., and wherein the glassy polymer comprises poly(phenylene oxide) or sulfonated poly(tetrafluoroethylene), or a combination or copolymer thereof.

2. The membrane of claim 1, wherein, in addition to the poly(phenylene oxide) or the sulfonated poly(tetrafluoroethylene), or a combination or copolymer thereof, the glassy polymer comprises polyimide, polybenzimidazole, polyphenylsulfone, polyamide, polysulfone, polyphenyl ether, cellulose nitrate, cellulose diacetate, cellulose triacetate, poly(vinyl alcohol), poly(phenylene sulfide), poly(vinyl chloride), polystyrene, poly(methyl methacrylate), polyacrylonitrile, polytetrafluoroethylene, polyetheretherketone, polycarbonate, polyvinyltrimethylsilane, polytrimethylsilylpropyne, poly(ether imide), poly(ether sulfone), polyoxadiazole, poly(phenylene oxide), or a combination or copolymer thereof.

3. The membrane of claim 2, wherein the glassy polymer is functionalized.

4. The membrane of claim 3, wherein the glassy polymer is sulfonated or halogenated.

5. The membrane of claim 4, wherein the glassy polymer is brominated.

6. The membrane of claim 5, wherein the glassy polymer comprises at least one of a brominated polyimide, a brominated polysulfone, and a brominated poly(phenylene oxide).

7. The membrane of claim 1, wherein the helium/carbon dioxide ideal selectivity of the membrane is between 20 and 70.

8. The membrane of claim 1, wherein the helium/nitrogen ideal selectivity of the membrane is greater than 70.

9. The membrane of claim 1, wherein the helium/methane ideal selectivity of the membrane is greater than 70.

10. The membrane of claim 1, wherein the helium permeance of the membrane is between 5 and 150 GPU (10-6 cm3(STP)/cm 2/sec/cmHg) at an operating feed pressure of 50 psia.

11. A method of forming a hollow fiber membrane for gas separation, the method comprising:
   dissolving a glassy polymer in a solvent to yield a solution, wherein the glassy polymer comprises poly(phenylene oxide) or sulfonated poly(tetrafluoroethylene), or a combination or copolymer thereof;
   contacting the solution comprising the glassy polymer with an aromatic polyamide layer of a composite membrane; and
   drying the solution to form a coating of the glassy polymer on the aromatic polyamide layer of the composite membrane to plug defects in the aromatic polyamide layer and give the hollow fiber membrane for gas separation,
   wherein the aromatic polyamide layer is formed by interfacial polymerization, and the glassy polymer has a glass transition temperature greater than 50° C.

12. The method of claim 11, wherein the glassy polymer comprises poly(phenylene oxide).

13. The method of claim 11, wherein the solvent comprises chloroform.

14. The method of claim 11, wherein, in addition to the poly(phenylene oxide) or the sulfonated poly(tetrafluoroethylene), or a combination or copolymer thereof, the glassy polymer comprises polyimide, polybenzimidazole, polyphenylsulfone, polyamide, polysulfone, polyphenyl ether, cellulose nitrate, cellulose diacetate, cellulose triacetate, poly(vinyl alcohol), poly(phenylene sulfide), poly(vinyl chloride), polystyrene, poly(methyl methacrylate), polyacrylonitrile, polytetrafluoroethylene, polyetheretherketone, polycarbonate, polyvinyltrimethylsilane, polytrimethylsilylpropyne, poly(ether imide), poly(ether sulfone), polyoxadiazole, poly(phenylene oxide), or a copolymer thereof.

15. The method of claim 11, wherein contacting the solution with the aromatic polyamide layer comprises slot die coating, spin coating, dip coating, or spray coating the solution on the aromatic polyamide layer.

16. A gas separation method comprising:
   contacting a gas feed stream comprising carbon dioxide and at least one of helium and hydrogen with a gas separation membrane comprising a hollow fiber membrane to yield a permeate stream and a reject stream, wherein a concentration of helium or hydrogen in the permeate stream exceeds the concentration of helium or hydrogen, respectively, in the gas feed stream, and wherein the gas separation membrane comprises:

a porous support layer;
   an aromatic polyamide layer formed on the porous support layer via interfacial polymerization; and
   a coating comprising a glassy polymer formed on the aromatic polyamide layer and that plugs defects in the aromatic polyamide layer, wherein a glass transition temperature of the glassy polymer is greater than 50° C., and wherein the glassy polymer comprises poly(phenylene oxide) or sulfonated poly(tetrafluoroethylene), or a combination or copolymer thereof.

17. The method of claim 16, wherein the gas feed stream comprises at least 100 ppm by volume of helium, hydrogen, or a combination thereof.

18. The method of claim 16, wherein the gas feed stream comprises up to 90 vol % of helium, hydrogen, or a combination thereof.

19. The method of claim 16, wherein the permeate stream comprises at least 90 vol % of the helium in the gas mixture, at least 90 vol % of the hydrogen in the gas mixture, or both.

20. The method of claim 16, wherein the permeate stream comprises at least 85 vol % of helium, at least 85 vol % of hydrogen, or at least 85 vol % of a combination of helium and hydrogen.

* * * * *